United States Patent
Gannon et al.

(10) Patent No.: US 10,810,888 B2
(45) Date of Patent: Oct. 20, 2020

(54) AUTOMATIC FROM-WAYPOINT UPDATING SYSTEM AND METHOD

(71) Applicant: HONEYWELL INTERNATIONAL INC., Morris Plains, NJ (US)

(72) Inventors: Aaron James Gannon, Anthem, AZ (US); Ivan Sandy Wyatt, Scottsdale, AZ (US); John Meeker, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 214 days.

(21) Appl. No.: 16/003,328

(22) Filed: Jun. 8, 2018

(65) Prior Publication Data
US 2019/0378420 A1    Dec. 12, 2019

(51) Int. Cl.
*G08G 5/00* (2006.01)
*G05D 1/08* (2006.01)

(52) U.S. Cl.
CPC ......... *G08G 5/0039* (2013.01); *G05D 1/0808* (2013.01)

(58) Field of Classification Search
CPC .................... G08G 5/0039; G05D 1/0808
See application file for complete search history.

(56) References Cited

U.S. PATENT DOCUMENTS

| 5,945,943 | A  | * | 8/1999 | Kalafus | G01S 19/15 342/33 |
| 6,571,171 | B1 | * | 5/2003 | Pauly | G01C 23/00 244/175 |
| 7,024,287 | B2 |   | 4/2006 | Peckham et al. | |
| 8,694,184 | B1 | * | 4/2014 | Boorman | G01C 23/00 340/945 |
| 8,744,747 | B1 | * | 6/2014 | Bailey | G08G 5/0013 701/408 |
| 9,098,997 | B2 | * | 8/2015 | Stewart | G08G 5/003 |
| 9,115,995 | B1 |   | 8/2015 | Owen et al. | |
| 9,261,369 | B2 |   | 2/2016 | Albert et al. | |
| 2008/0004757 | A1 |   | 1/2008 | Ingram et al. | |
| 2009/0157237 | A1 |   | 6/2009 | Bitar et al. | |
| 2009/0319100 | A1 | * | 12/2009 | Kale | G08G 5/0021 701/4 |
| 2010/0030401 | A1 | * | 2/2010 | Rogers | G01C 23/00 701/3 |
| 2011/0010082 | A1 | * | 1/2011 | Wilson | G01C 21/20 701/532 |

(Continued)

*Primary Examiner* — Calvin Cheung
(74) *Attorney, Agent, or Firm* — Lorenz & Kopf, LLP (57) ABSTRACT

A system and method for providing automatic from-waypoint updating includes determining when a flight plan has been received that includes rendering a lateral map image that includes an aircraft icon and a flight leg to be captured. A variable position user input device supplies a signal representative of its position. A processor processes the signal from the variable position user input device and commands a display device to render a trajectory line graphic that (a) extends from the aircraft icon in a direction that corresponds to the position of the variable user input device and (b) intersects the at least one flight leg to be captured. The flight plan is automatically updated to designate the waypoint at the start of the at least one flight leg as a from-waypoint.

18 Claims, 6 Drawing Sheets

(56) References Cited

U.S. PATENT DOCUMENTS

| | | | |
|---|---|---|---|
| 2012/0053760 A1* | 3/2012 | Burnside | G05D 1/0676 |
| | | | 701/3 |
| 2012/0179368 A1 | 7/2012 | Walter | |
| 2013/0060466 A1 | 3/2013 | Gurusamy et al. | |
| 2015/0260525 A1* | 9/2015 | Parthasarathy | G08G 5/0039 |
| | | | 701/538 |
| 2015/0338237 A1* | 11/2015 | Bonamy | G01C 23/005 |
| | | | 340/973 |
| 2017/0263137 A1* | 9/2017 | Nostry | G08G 5/0021 |
| 2017/0349295 A1* | 12/2017 | Pepitone | B64D 43/00 |
| 2018/0149493 A1* | 5/2018 | Bleeg | G01C 23/00 |
| 2018/0162546 A1* | 6/2018 | Gowda | G06F 3/14 |
| 2018/0268721 A1* | 9/2018 | McCullough | G06F 3/04845 |

* cited by examiner

AUTOMATIC FROM-WAYPOINT UPDATING SYSTEM AND METHOD

TECHNICAL FIELD

The present invention generally relates to providing feedback to aircraft pilots, and more particularly relates to systems and methods for providing automatic from-waypoint updating.

BACKGROUND

During a flight, a pilot may receive a clearance that shortcuts an existing waypoint in a flight plan. This may occur, for example, by the pilot either (1) being cleared direct to a downstream waypoint or (2) receiving radar vectors off plan that will eventually result in a downstream re-interception of the flight plan (either at a waypoint or between waypoints).

The first case is handled well in current systems. This is because the "from" position is naturally defined by the aircraft position, the flight plan is naturally connected by going direct, and unused intervening waypoints are automatically removed from the flight plan in the process of the "Direct" activation. Simply stated, the aircraft always remains on flight plan, and there is no confusion with waypoints that will not be used (because they are removed).

The second (and very frequent) case, however, where the aircraft is being vectored, takes the aircraft path away from the plan without defining a re-interception point. Because of this, there will likely be some waypoints that will go unused, but remain in the flight plan. This can create confusion, both for the pilot (e.g., visually, cognitively) and for the system, which needs a definition of a "from" waypoint to put the aircraft back on flight plan, potentially with some time pressure associated with a departure, arrival, or approach procedure.

In today's systems, the pilot needs to recognize a re-interception point, update this expectation as radar vectors are changed, and when the interception becomes certain, recognize and select the from-waypoint and designate it as the from-waypoint. This may typically happen during arrival and approach phases of flight where time is limited and workload trends higher, potentially resulting in inappropriate from-waypoint behavior, unresolved discontinuities, lack of crew awareness, misarmed modes, and potentially unstable flight.

Hence, there is a need for a system and method of automatically updating the from-waypoint that prevents inappropriate from-waypoint behavior and unresolved discontinuities, improves crew awareness, and reduces the likelihood of misarmed modes and unstable flight. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for providing automatic from-waypoint updating includes a display device configured to render images, a variable position user input device configured to supply a signal representative of its position, and a processor in operable communication with the display device and the variable position user input device. The processor is coupled to receive a flight plan that includes at least one flight leg to be captured by the aircraft and at least one waypoint. The at least one flight leg has a start end and a finish end, and the at least one waypoint is positioned at the start end of the at least one flight leg. The processor is further coupled to receive the signal from the variable user input device, and is configured to: (i) command the display device to render a lateral map image that includes an aircraft icon and the flight leg to be captured, where the aircraft icon rendered at a position on the lateral map that corresponds to current aircraft lateral position and oriented to indicate direction of travel of the aircraft, (ii) command the display device to render a trajectory line graphic that (a) extends from the aircraft icon in a direction that corresponds to the position of the variable user input device and (b) intersects the at least one flight leg to be captured, and (iii) automatically update the flight plan to designate the waypoint at the start of the at least one flight leg as a from-waypoint.

In another embodiment, a method for providing automatic from-waypoint updating includes determining, in a processor, when a flight plan has been received that includes at least one waypoint and a flight leg that needs to be captured by the aircraft, where the at least one flight leg has a start end and a finish end, and the at least one waypoint is positioned at the start end of the at least one flight leg. A display device is commanded, using the processor, to render a lateral map image that includes an aircraft icon and the flight leg to be captured, the aircraft icon rendered at a position on the lateral map that corresponds to current aircraft lateral position and oriented to indicate direction of travel of the aircraft. A variable position user input device supplies a signal representative of the position of the variable position user input device and the processor processes the signal from the variable position user input device. The display device is commanded, using the processor, to render a trajectory line graphic that (a) extends from the aircraft icon in a direction that corresponds to the position of the variable user input device and (b) intersects the at least one flight leg to be captured. The flight plan is automatically updated to designate the waypoint at the start of the at least one flight leg as a from-waypoint.

In yet another embodiment, a system for providing automatic from-waypoint updating includes a display device configured to render images, a lateral position sensor configured to sense the current aircraft lateral position and supply position signals representative thereof, a directional position sensor configured to sense the direction of travel of the aircraft and supply direction signals representative thereof, a variable position user input device configured to supply a signal representative of its position, and a processor in operable communication with the display device, the lateral position sensor, the directional position, sensor, and the variable position user input device. The processor is coupled to receive a flight plan that includes at least one flight leg to be captured by the aircraft and at least one waypoint, where the at least one flight leg has a start end and a finish end, and the at least one waypoint is positioned at the start end of the at least one flight leg. The processor is further coupled to receive the position signals, the direction signals, the signal from the variable user input device, and an autopilot mode signal that indicates an active mode of the autopilot. The processor is configured to: (i) command the display device to render a lateral map image that includes an aircraft icon, the at least one waypoint, and the flight leg to be captured, where the aircraft icon is rendered at a position on the lateral map that corresponds to current aircraft lateral position and oriented to indicate direction of travel of the aircraft, (ii) command the display device to render a trajectory line graphic that (a) extends from the aircraft icon in a direction that corresponds to the position of the variable user input device and (b) intersects the at least one flight leg to be captured, (iii) command the display device to render a textual icon adjacent to the aircraft icon, the textual icon representative of the active mode of the autopilot, and (iv) automatically update the flight plan to designate the waypoint at the start of the at least one flight leg as a from-waypoint.

Furthermore, other desirable features and characteristics of the automatic from-waypoint updating system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
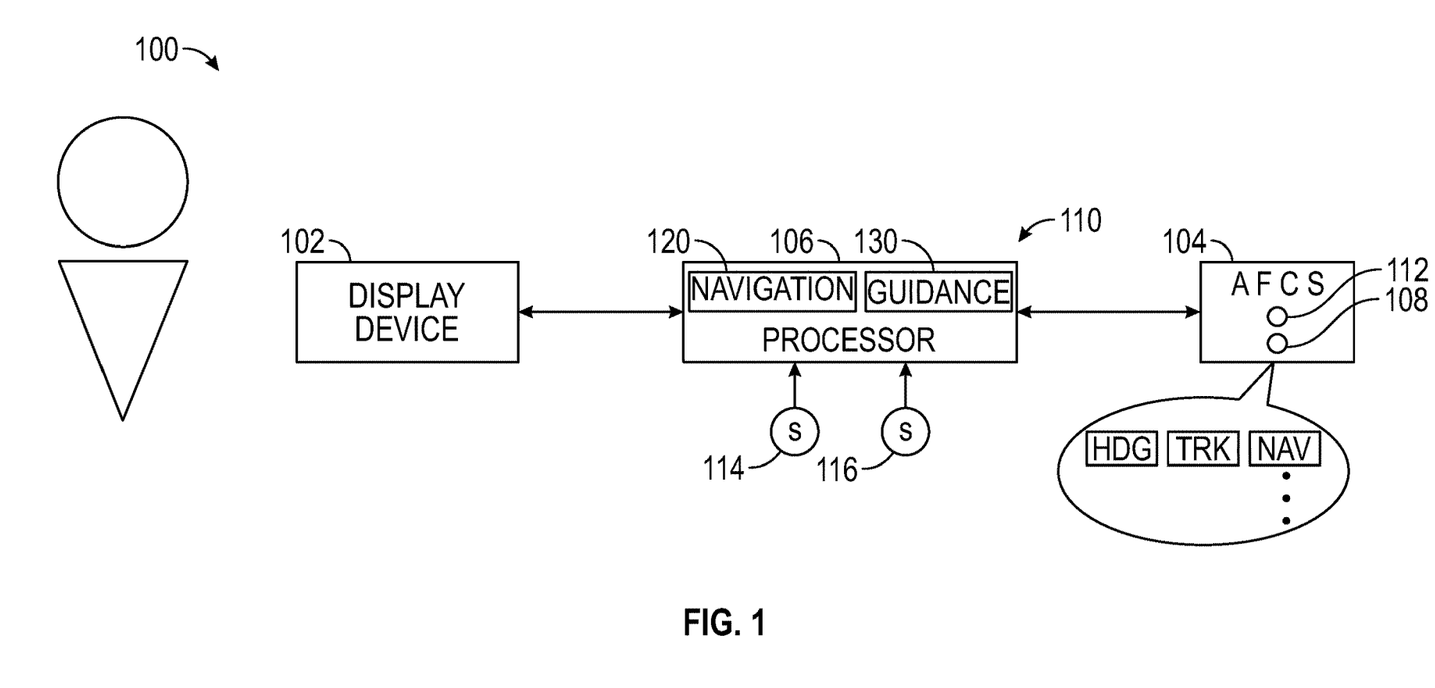
FIG. 1 is a functional block diagram of one embodiment of an aircraft system for providing automatic updating of the from-waypoint.

Referring first to FIG. 1, a functional block diagram of one embodiment of an aircraft system 100 for providing aircraft lateral navigation system capability feedback to a pilot is depicted, and includes a display device 102, an automatic flight control system 104, and a processor 106. The display device 102 is configured, in response to image rendering display commands received from the processor 106, to render various types of images. Some of the images the display device 102 renders will be described in more detail further below.

The display device 102 may vary in configuration and implementation. For example, the display device 102 may be configured as any one of numerous types of aircraft avionics displays including, but not limited to, a multi-function display (MFD), a primary flight display (PFD), or a horizontal situation indictor (HSI), just to name a few. Moreover, the display device may be implemented using any one of numerous types of display technologies including, but not limited to, various cathode ray tube (CRT) displays, various liquid crystal displays (LCDs), various light emitting diode (LED) displays, various plasma displays, various head down displays (HDDs), various projection displays, and various head up displays (HUDs), just to name a few.

The automatic flight control system 104, when it is engaged, is responsive to guidance commands to generate suitable actuator commands that function to control the flight characteristics of the aircraft via various non-illustrated actuators. The guidance commands, as will be described further below, may be supplied from, for example, a flight management system (FMS). Before proceeding further, it is noted that the depicted automatic flight control system 104 also implements the functionality of a flight director, which, as is generally known, may also provide the guidance commands. In other embodiments, the flight director may be implemented separate from the autopilot.

As FIG. 1 further depicts, the automatic flight control system 104 may be operated in any one of numerous modes. The number and types of autopilot modes may vary, depending, for example, on the particular automatic flight control system 104. The modes, which in some embodiments may be selected via a mode selector user interface 108, include at least a HDG (heading) mode, a TRK (track) mode, and a NAV (navigation) mode, each of which will be briefly described. Before doing so, however, it will be appreciated that most automatic flight control systems 104 will include additional operational modes. However, a description of these additional modes is not needed to enable the embodiments described herein. Thus, the descriptions and depictions of these additional modes are not included. Moreover, it will be appreciated that the NAV mode, as used herein, includes NAV (lateral navigation), RNP (required navigation performance), and any other mode that will capture a planned lateral path, be it ground-based NAV, RNAV, straight, or curved.

In the HDG mode, the automatic flight control system 104 will point the aircraft in a preset heading and maintain that heading. The preset heading may be selected via a variable position input device 112, which may, in some embodiments, be implemented using a rotary knob. In the TRK mode, the automatic flight control system 104 may use, for example, global positioning system (GPS) to maintain the ground track of the aircraft on a straight line toward preset heading. Here too, the preset heading may be selected via the variable position input device 112. As is generally known, if there is a crosswind while in the HDG mode, the aircraft ground track will drift with the crosswind. Conversely, if there is a crosswind while in the TRK mode, the automatic flight control system 104 will adjust the aircraft heading to maintain a straight line over the ground. In the NAV mode, the autopilot controls the lateral navigation of the aircraft to fly and/or capture, for example, a preset flight plan that has been set, for example, in the FMS.

Before proceeding further, it should be noted that the automatic flight control system 104 is, for clarity and ease of depiction, illustrated as being implemented separate from the processor 106. It will be appreciated that the automatic flight control system 104 functionality may, in some embodiments, be implemented in the processor 106.

The processor 106 is in operable communication with at least the display device 102 and the automatic flight control system 104. The processor 106 is coupled to receive various signals from the automatic flight control system 104. These signals include, for example, an autopilot mode signal, which indicates the active mode of the automatic flight control system, an autopilot armed signal, which indicates an autopilot mode is armed and ready to become the active mode when the logic for its activation is met, and a signal from the variable position user input device 112 that is representative of its position. The processor 106 is configured, in response to the received signals, to, among other functions, provide automatic from-waypoint updating. The automatic from-waypoint updating function will be described in more detail momentarily. Before doing so, however, it should be understood that although the processor 106 is depicted in FIG. 1 using a single functional block, the exemplary embodiments are not so limited. Indeed, in some embodiments the processor 106 may be implemented using a plurality of processors, components, or subcomponents of various systems located either onboard or external to an aircraft. The processor 106 may be implemented using any one (or a plurality) of numerous known general-purpose microprocessors or application specific processor(s) that operate in response to program instructions. The processor 106 may also be implemented using various other circuits, not just a programmable processor. For example, digital logic circuits and analog signal processing circuits could also be used. In this respect, the processor 106 may include or cooperate with any number of software programs or instructions designed to carry out various methods, process tasks, calculations, and control/display functions described herein. Furthermore, the systems and methods described herein are not limited to manned aircraft and can also be implemented for other types of vehicles, such as, for example, spacecraft or unmanned vehicles.

In the depicted embodiment, the processor 106 is configured to implement a flight management system (FMS) 110. It will be appreciated, however, that the processor 106 may additionally be configured to implement any one of numerous other functions in an aircraft. For example, and as already mentioned, the processor 106 may be configured to implement the automatic flight control system 104 functionality. As is generally known, and as FIG. 1 further depicts, the FMS 110 may include a navigation system 120 and a guidance system 130. An FMS 110, as is generally known, is configured to perform a wide variety of in-flight tasks during operation of an aircraft. These tasks include aircraft navigation and guidance, which are implemented, at least in the depicted embodiment, by the navigation system 120 and the guidance system 130, respectively. Although not specifically shown, the FMS 110 may additionally include a database with any elements necessary for the operation of the aircraft and the creation and implementation of a flight plan, including waypoints, airports, terrain information and applicable flight rules. Moreover, at least in some embodiments, the automatic flight control system 104 may be used to set and arm guidance targets.

The navigation system 120 determines the current kinematic state of the aircraft. As such, in the exemplary embodiment, the navigation system 120 includes any suitable position and direction determination devices, such as an inertial reference system (IRS), an attitude and heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, path, and any desired flight information.

The guidance system 130 uses various flight and engine models and algorithms to construct lateral and vertical profiles for various segments that make up a flight plan based on navigation information received from the navigation system 120 (e.g., the current position and velocity) and inputs from the pilot or other source (e.g., the desired destination). As examples, the guidance system 130 may generate the flight plan based on considerations for timing, position, altitude, speed targets, and fuel economy. The guidance system 130 may also consider aircraft-specific parameters such as weight, fuel, and atmospheric conditions. In one scenario, aspects of the flight plan may be dictated by Air Traffic Control (ATC), Federal Aviation Administration (FAA) rules, or European Aviation Safety Agency (EASA) rules.

The flight plan may include a number of flight legs, each of which is disposed between two waypoints, and each of which includes a start end and a finish end. Each of the waypoints has an associated position, altitude, speed, and time that the aircraft is scheduled to fly. It should be noted that the waypoint at the start end of each flight leg is referred to herein as a "from-waypoint." The guidance system 130 generates, as previously mentioned, the guidance commands that are supplied to the automatic flight control system 104. For example, the commands generated by the guidance system 130 associated with the flight plan may include pitch commands, pitch rate commands, roll commands, and speed targets that function to implement the lateral and vertical profiles. Before proceeding further, it is noted that the FMS 110 is particularly discussed as controlling the aircraft to capture a flight leg of a flight plan, although the exemplary embodiments discussed herein are equally applicable to other flight scenarios.

As noted above, the processor 106 is configured, in addition to the above-described functions, to implement a process that provides automatic from-waypoint updating. The general process 200, which is depicted in flowchart form in FIG. 2, includes the processor 106 receiving a flight plan that includes at least one flight leg needs to be captured by the aircraft, and further includes at least one waypoint positioned at the start end of the at least one flight leg (202). The processor 106 commands the display device 102 to render a lateral map image that includes at least an aircraft icon and the flight leg to be captured (204). In some instances, which are described further below, the lateral map image may also include the waypoint positioned at the start end of the flight leg to be captured.

Before proceeding further, it should be noted that the aircraft icon is preferably rendered at a position on the lateral map that corresponds to the current aircraft lateral position, and is preferably oriented to indicate direction of travel of the aircraft. To provide this functionality, the aircraft system 100 may additionally include, at least in some embodiments, various sensors to sense the current lateral position and the direction of travel of the aircraft. In the depicted embodiment, and with reference back to FIG. 1, the system 100 is depicted as including a lateral position sensor 114 and a directional position sensor 116. The lateral position sensor 114 is configured to sense the current aircraft lateral position and supply position signals representative thereof to the processor 106, and the directional position sensor 116 is configured to sense the direction of travel of the aircraft and supply direction signals representative thereof to the processor 106. Although the lateral and directional position sensors 114, 116 are depicted as separate, individual sensors, it will be appreciated that in some embodiments, each sensor 114, 116 may comprise a plurality of sensor devices, and that in other embodiments, one or more sensors could implement the functionality of both—lateral position sensing and directional sensing.

Returning now to FIG. 2, it is seen that the process further includes the processor 106 receiving and processing the signal from the variable position user input device 112 (206), and commanding the display device 102 to render a trajectory line graphic (208). As will be described momentarily, the rendered trajectory line graphic extends from the aircraft icon in a direction that corresponds to the position of the variable user input device 112 and intersects the at least one flight leg to be captured. The processor 106 also automatically updates the flight plan to designate the waypoint at the start end of the at least one flight leg as the from-waypoint (212).

Figure 2:
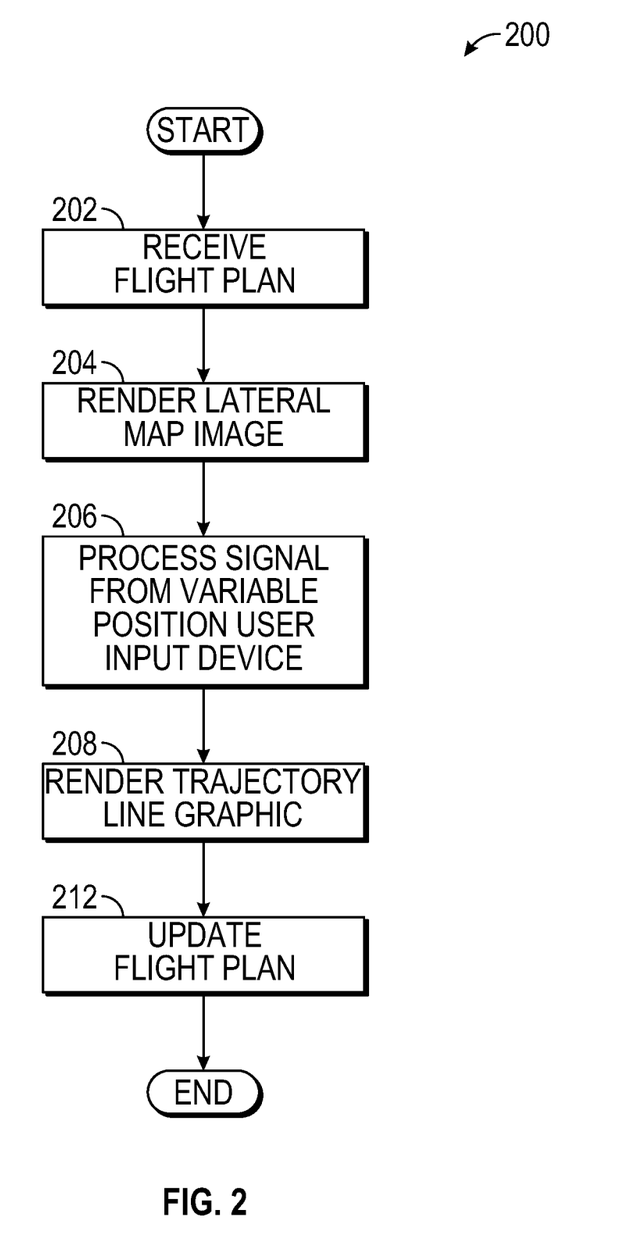
FIG. 2 depicts a process, in flowchart form, that may be implemented in the system of FIG. 1 for providing automatic updating of the from-waypoint.

To even more clearly describe and depict the automatic from-waypoint updating functionality of the system 100, one particular instantiation of the process depicted in FIG. 2 will now be described. For this particular instantiation, the active mode of the automatic flight control system 104 is the TRK mode, and the pilot wants to capture a flight leg of a flight plan and for the active mode of the automatic flight control system 104 to transition the NAV mode. It will be understood by persons of skill in the art that the depicted process is generally the same when the active mode of the automatic flight control system 104 is initially the HDG mode.

Figure 3:
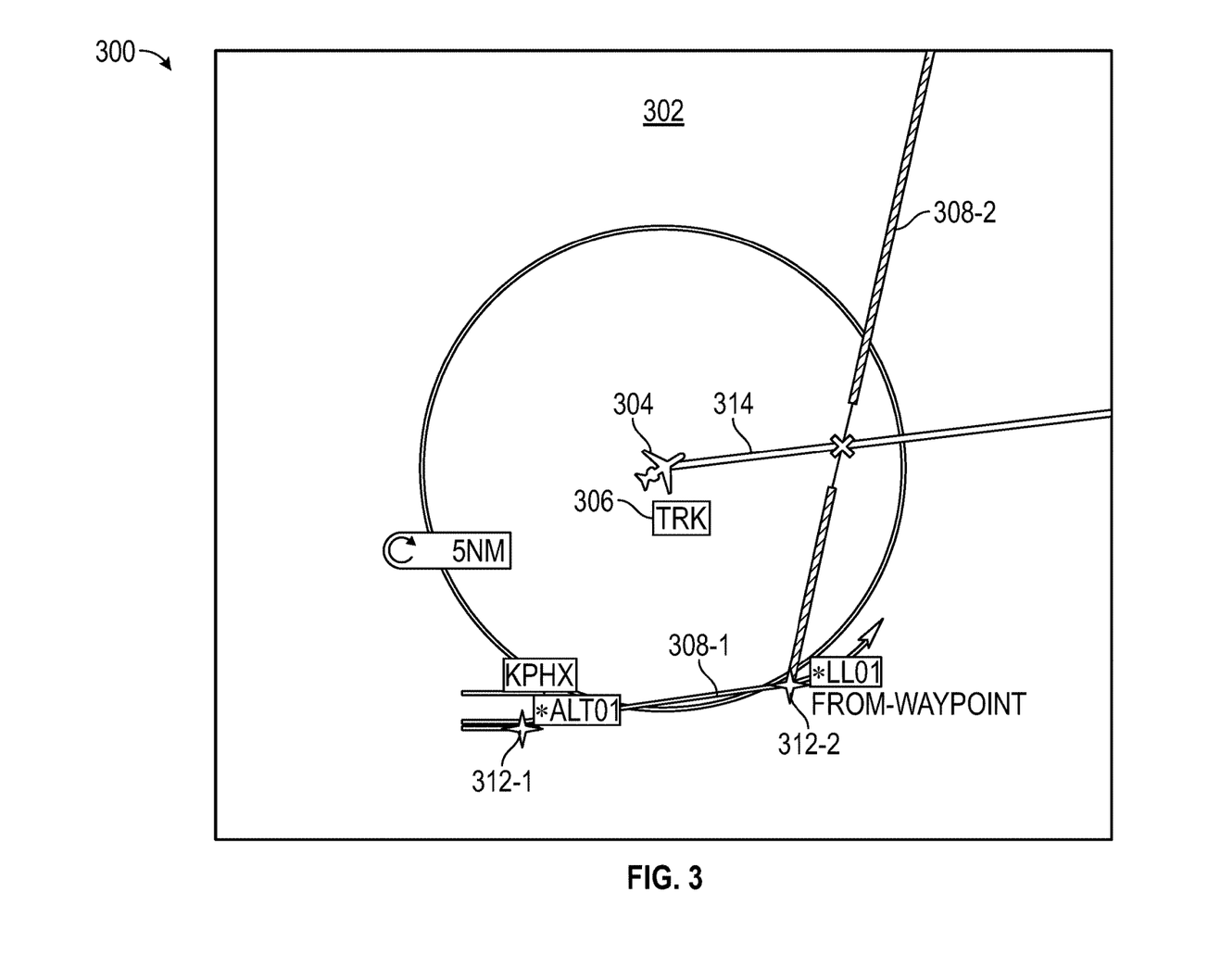
FIGS. 3-6 graphically depict one instantiation of the process of FIG. 2 that may be implemented by the system of FIG. 1.

Referring first to FIG. 3, an embodiment of an image 300 rendered by the display device 102 is depicted. The image 300, which is a lateral map 302, includes at least an aircraft icon 304. The aircraft icon 304s rendered at a position on the lateral map 302 that corresponds to the current aircraft lateral position, and is oriented to indicate the direction of travel of the aircraft.

The processor 106, as previously noted, is coupled to receive an autopilot mode signal that indicates the active mode of the automatic flight control system 104. The processor 106 is configured, in response to the autopilot mode signal, to command the display device 102 to render, adjacent to the aircraft icon 302, a textual icon 306 that is representative of the active mode. As noted, for this example the initial active mode of the automatic flight control system 104 is the TRK mode. As such, the first textual icon 306 is rendered as "TRK" to indicate such.

The rendered image 300 also includes a plurality of flight legs 308 (a first flight leg 308-1 and a second flight leg 308-2) and a plurality of waypoints 312 (a first waypoint 312-1 and a second waypoint 312-2). Each of the rendered flight legs 308 includes a start end and a finish end, and one of the waypoints 312 is disposed at the start end and the finish end of each flight leg. As may be appreciated, the finish end of the first flight leg 308-1 corresponds to the start end of the second flight leg 308-2. Thus, the second waypoint 312-2 is disposed both at the finish end of the first flight leg 308-1 and at the start end of the second flight leg 308-2. Before proceeding further, it is noted that although the rendered images 300 depicted in FIGS. 3-6 include the waypoints 312 at the start of each flight leg 308, in some instances start end of one or more of the flight legs may not be rendered on the display device 102. That is, the start end of the flight leg 308, and thus the associated waypoint 312 at the start end, may be "off-screen" and thus not visible to the flight crew.

Returning again to the description, the rendered image 300 also includes a trajectory line graphic 314 that extends from the aircraft icon 304nd intersects one of the flight legs 308. In the depicted instance, the trajectory line graphic 314 is intersecting the second flight leg 308-2. Thus, while not illustrated in FIG. 3, the processor 106 also automatically updates the flight plan to designate the second waypoint 312-2, which is disposed at the start end of the second flight leg 308-2, as the from-waypoint. In some embodiments, the processor 106 may also command the display device 102 to render the flight leg 308 that is intersected by the trajectory line graphic 314 using a display paradigm that differs from the other rendered flight legs 308. For example, in FIG. 3, because the second flight leg 308-2 is intersected by the trajectory line graphic 314, it is rendered using a first display paradigm, and the first flight leg 308-1 is rendered using a second display paradigm that is different from the first display paradigm. In some embodiments, the processor 106 may also command the display device 102 to render the from-waypoint (when it is "on-screen") using a unique display paradigm. For example, in FIG. 3, the second waypoint 312-2 symbol or text (i.e., XLL01) or both, could be rendered using a display paradigm that differs from the first waypoint 312-1 symbol or text (XALT01) or both. Some examples of different display paradigms include, but are not limited to, highlighting the waypoint name, highlighting the waypoint, or blooming or changing the line style. In other embodiments, the processor 106 may also (or instead) command the display device 102 to render additional text, such as "FROM-WAYPOINT", adjacent to the from-waypoint. This additional rendering is depicted in FIGS. 3-6. It will be appreciated that text other than "FROM-WAYPOINT" could be used.

Figure 5:
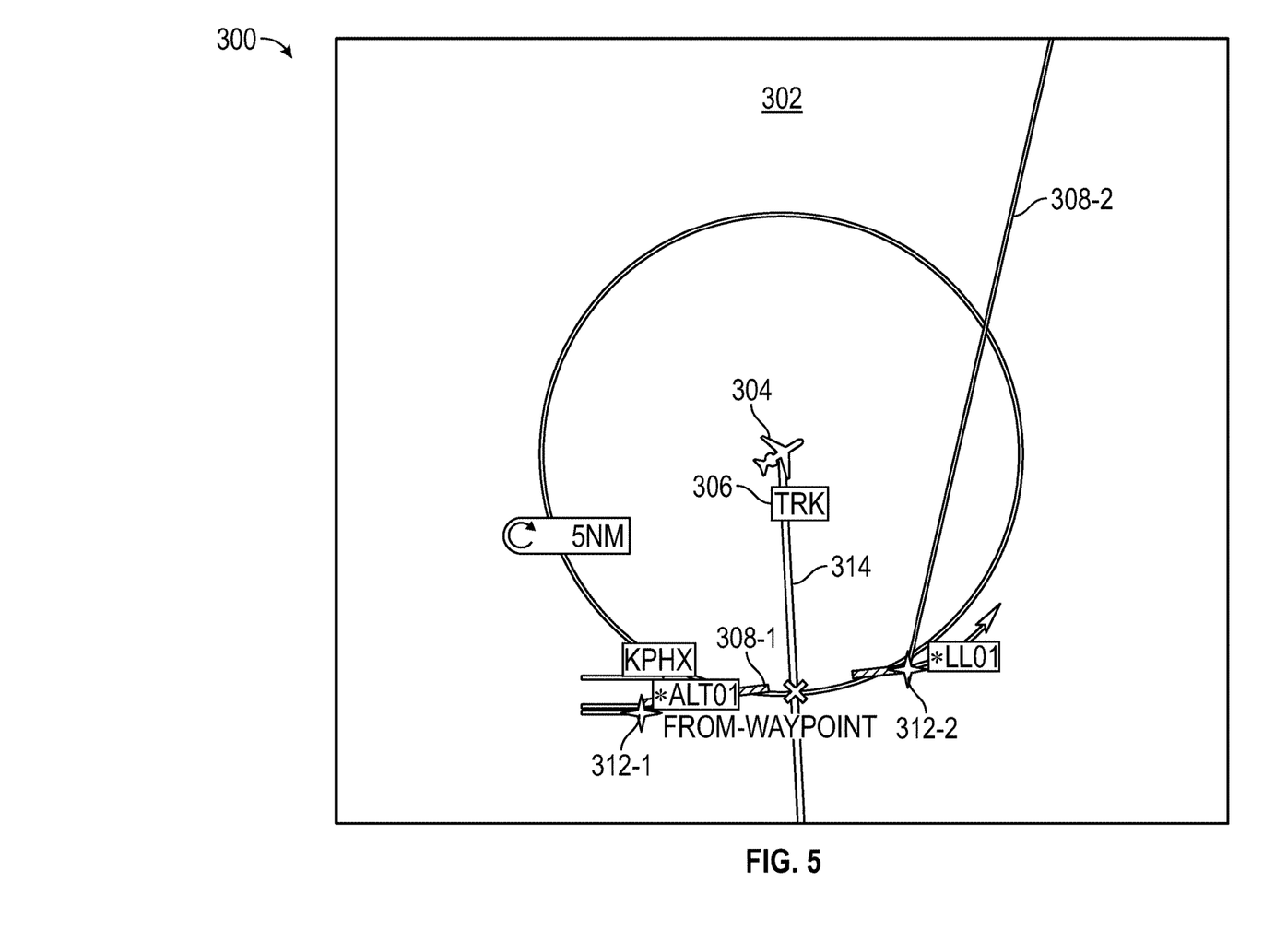
Figure 6:
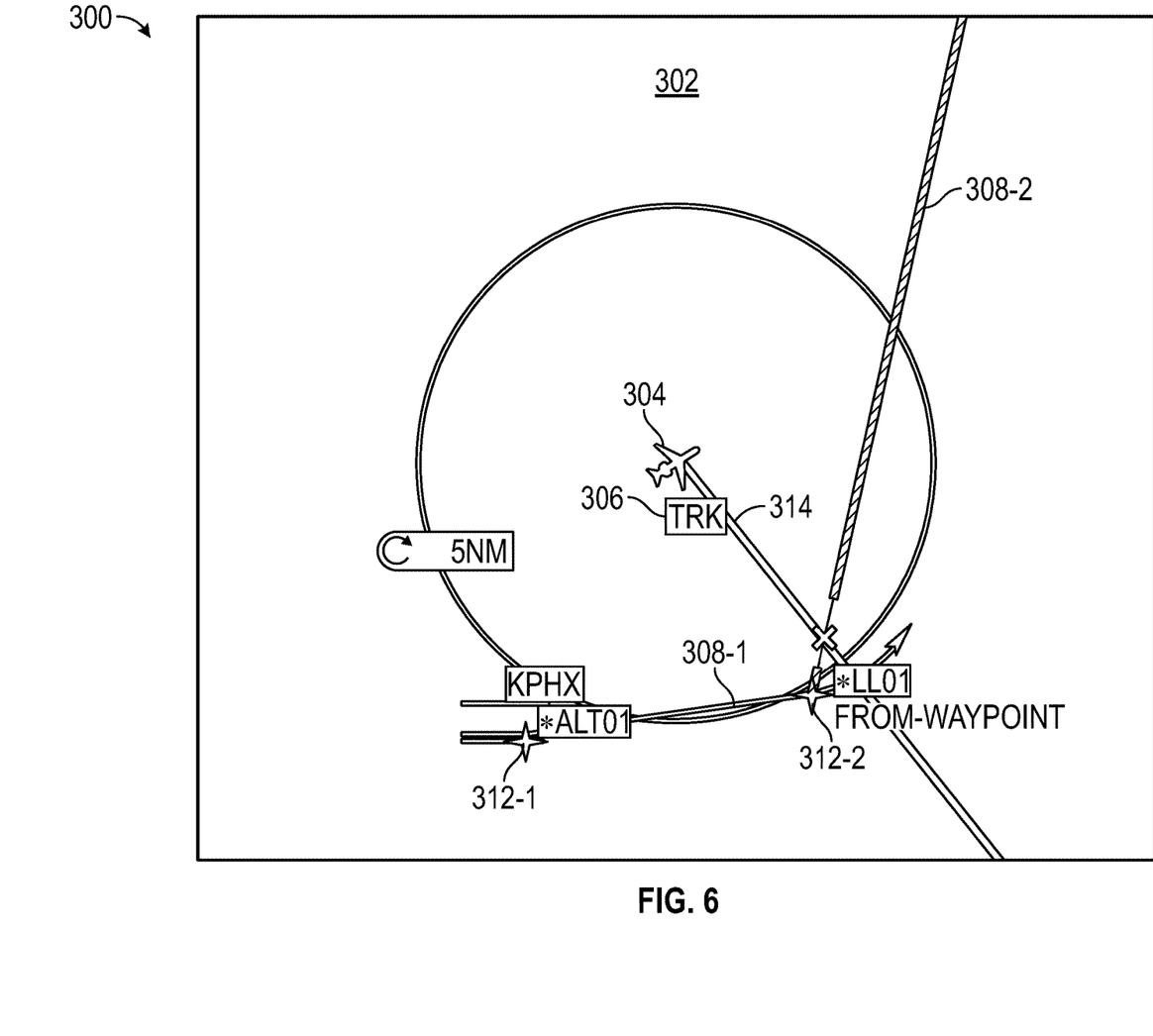

As was noted above, the processor 106 commands the display device 102 to render the trajectory line graphic 314 such that it extends from the aircraft icon 302 in a direction that corresponds to the position of the variable user input device 112. Thus, if the pilot varies the position of the variable user input device 112, the direction in which the trajectory line graphic 314 extends from the aircraft icon 304 will also vary. Moreover, if the position of the variable user input device 112 is varied such that the trajectory line graphic 314 intersects a different flight leg 308, the processor 106 will automatically update the flight plan to designate the waypoint at the start end of the different flight leg 308 as the new from-waypoint. This functionality is illustrated in FIGS. 4-6, which depict the trajectory line graphic 314 extending in different directions as the position of the variable user input device 112 is varied.

Figure 4:
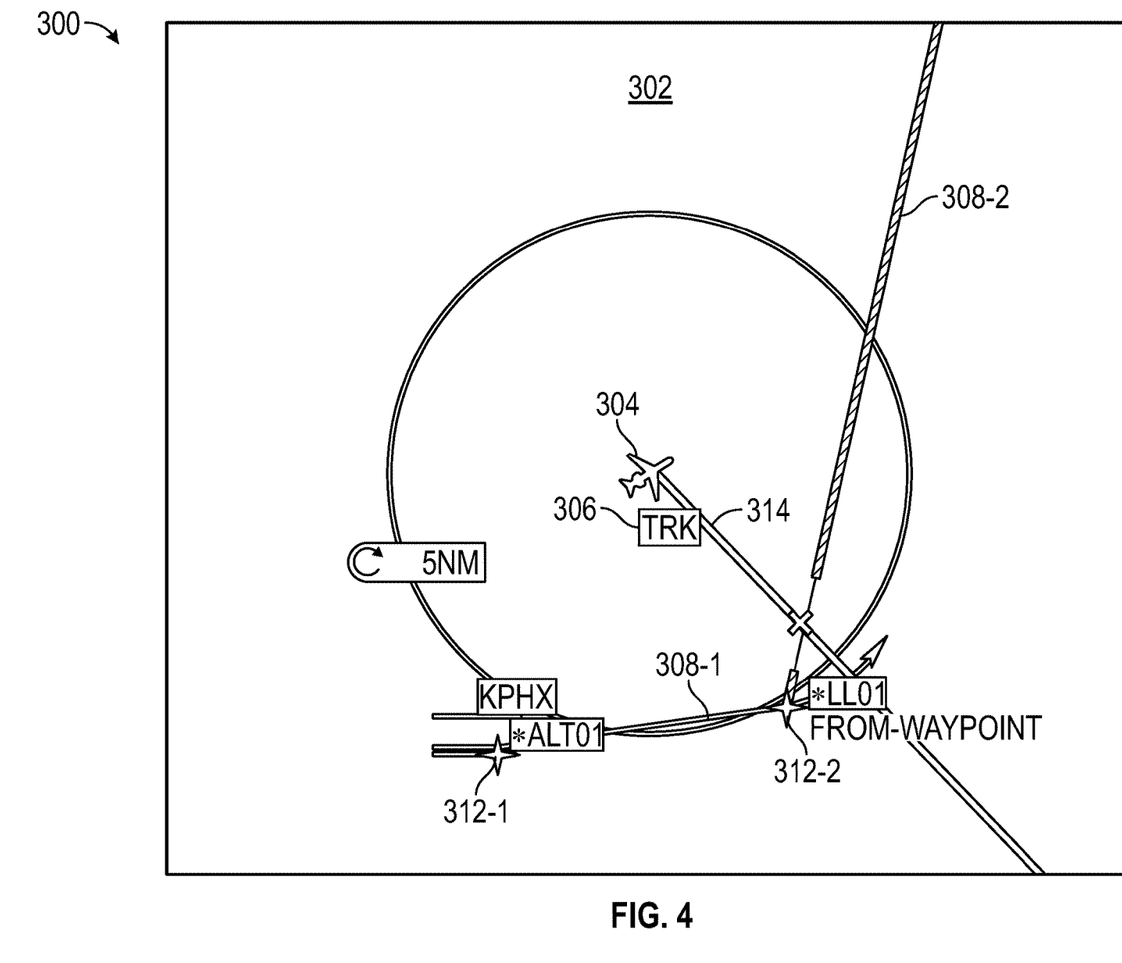

In FIG. 4, even though the trajectory line graphic 314 is extending in a different direction, it is still intersecting the second flight leg 308-2. As such, the second waypoint 312-2 remains designated as the from-waypoint. In FIG. 5, however, the variable user input device 112 is positioned such that the trajectory line graphic 314 is now intersecting the first flight leg 308-1. As such, the processor 106 automatically updated the flight plan to designate the first waypoint 308-1 as the from-waypoint. The processor 106 also commanded the display device 102 to render the first flight leg 308-1 using the first display paradigm, the second flight leg 308-2 using the second display paradigm, and to render "FROM-WAYPOINT" adjacent to the first waypoint 308-1. If, as shown in FIG. 6, the variable user input device 112 is positioned such that the trajectory line graphic 314 once again intersects the second flight leg 308-2, the processor 106 will automatically update the flight plan to again designate the second waypoint 308-2 as the from-waypoint. The processor 106 will also again command the display device 102 to render the second flight leg 308-2 using the first display paradigm, the first flight leg 308-1 using the second display paradigm, and to render "FROM-WAYPOINT" adjacent to the second waypoint 308-2.

The system and method described herein provides automatic updating of the from-waypoint in a flight plan to thereby prevent, or at least inhibit, inappropriate from-waypoint behavior and unresolved discontinuities, improves crew awareness, and reduces the likelihood of misarmed modes.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for providing automatic from-waypoint updating, the system comprising:
   a display device configured to render images;
   a variable position user input device configured to supply a signal representative of its position; and
   a processor in operable communication with the display device and the variable position user input device, the processor coupled to receive a flight plan that includes at least one flight leg to be captured by the aircraft and at least one waypoint, the at least one flight leg having a start end and a finish end, the at least one waypoint positioned at the start end of the at least one flight leg, the processor further coupled to receive the signal from the variable user input device, the processor configured to:
   (i) command the display device to render a lateral map image that includes an aircraft icon and the flight leg to be captured, the aircraft icon rendered at a position on the lateral map that corresponds to current aircraft lateral position and oriented to indicate direction of travel of the aircraft,
   (ii) command the display device to render a trajectory line graphic that (a) extends from the aircraft icon in a direction that corresponds to the position of the variable user input device and (b) intersects the at least one flight leg to be captured,
   (iii) automatically update the flight plan to designate the waypoint at the start of the at least one flight leg as a from-waypoint, (iv) command the display device to render the at least one flight leg to be captured using a first display paradigm when the trajectory line graphic intersects it, and (v) command the display device to render the at least one flight leg to be captured using a second display paradigm when the trajectory line graphic does not intersect.

2. The system of claim 1, wherein the processor is further configured to render the waypoint at the start of the at least one flight leg using one or more of:

a unique display paradigm, and additional text identifying the waypoint at the start of the at least one flight leg as the from-waypoint.

3. The system of claim 1, wherein:

the processor is further coupled to receive an autopilot mode signal that indicates an active mode of the autopilot; and the processor is further configured, in response to the autopilot mode signal, to command the display device to render a textual icon adjacent to the aircraft icon, the textual icon representative of the active mode of the autopilot.

4. The system of claim 3, further comprising:

an automatic flight control system, the automatic flight control system including the variable position user input device.

5. The system of claim 4, wherein:

the automatic flight control system further includes a mode selector user interface;

the mode selector user interface is movable to any one of a plurality of positions; and the automatic flight control system is configured to supply the autopilot mode signal based on the position of the mode selector user interface.

6. The system of claim 5, wherein:

the plurality of positions of the mode selector user interface include a heading (HDG) position and a track (TRK) position; and the variable position user input device supplies the signal representative of its position to the processor when the mode selector user interface is in either the HDG position or the TRK position.

7. The system of claim 1, wherein the variable position user input device comprises a rotary knob.

8. A method for providing automatic from-waypoint updating, the method comprising the steps of:

determining, in a processor, when a flight plan has been received that includes at least one waypoint and a flight leg that needs to be captured by the aircraft, the at least one flight leg having a start end and a finish end, the at least one waypoint positioned at the start end of the at least one flight leg;

commanding, using the processor, a display device to render a lateral map image that includes an aircraft icon and the flight leg to be captured, the aircraft icon rendered at a position on the lateral map that corresponds to current aircraft lateral position and oriented to indicate direction of travel of the aircraft;

supplying, from a variable position user input device, a signal representative of the position of the variable position user input device;

processing, in the processor, the signal from the variable position user input device;

commanding, using the processor, the display device to render a trajectory line graphic that (a) extends from the aircraft icon in a direction that corresponds to the position of the variable user input device and (b) intersects the at least one flight leg to be captured;

automatically updating, using the processor, the flight plan to designate the waypoint at the start of the at least one flight leg as a from-waypoint; and commanding, using the processor, the display device to render the waypoint at the start of the at least one flight leg using one or more of: a unique display paradigm and additional text identifying the waypoint at the start of the at least one flight leg as the from-waypoint.

9. The method of claim 8, further comprising:

receiving, in the processor, an autopilot mode signal that indicates an active mode of the autopilot; and commanding, using the processor, the display device to render a textual icon adjacent to the aircraft icon, the textual icon representative of the active mode of the autopilot.

10. The method of claim 8, further comprising:

suppling the signal representative of the position of the variable position user input device from an automatic flight control system that includes the variable position user input device; and supplying the autopilot mode signal, from the automatic flight control system, based on a position of a mode selector user interface that is movable to any one of a plurality of positions.

11. The method of claim 10, wherein:

the plurality of positions of the mode selector user interface include a heading (HDG) position and a track (TRK) position; and the variable position user input device supplies the signal representative of its position to the processor when the mode selector user interface is in either the HDG position or the TRK position.

12. The method of claim 8, further comprising:

supplying, from a lateral position sensor, position signals representative of the current aircraft lateral position to the processor.

13. The method of claim 12, further comprising:

supplying, from a directional position sensor, direction signals representative of the direction of travel of the aircraft to the processor.

14. A system for providing automatic from-waypoint updating, the system comprising:

a display device configured to render images;

a lateral position sensor configured to sense the current aircraft lateral position and supply position signals representative thereof;

a directional position sensor configured to sense the direction of travel of the aircraft and supply direction signals representative thereof;

a variable position user input device configured to supply a signal representative of its position; and a processor in operable communication with the display device, the lateral position sensor, the directional position, sensor, and the variable position user input device, the processor coupled to receive a flight plan that includes at least one flight leg to be captured by the aircraft and at least one waypoint, the at least one flight leg having a start end and a finish end, the at least one waypoint positioned at the start end of the at least one flight leg, the processor further coupled to receive the position signals, the direction signals, the signal from the variable user input device, and an autopilot mode signal that indicates an active mode of the autopilot, the processor configured to:
(i) command the display device to render a lateral map image that includes an aircraft icon, the at least one waypoint, and the flight leg to be captured, the aircraft icon rendered at a position on the lateral map that corresponds to current aircraft lateral position and oriented to indicate direction of travel of the aircraft,
(ii) command the display device to render a trajectory line graphic that (a) extends from the aircraft icon in a direction that corresponds to the position of the variable user input device and (b) intersects the at least one flight leg to be captured,
(iii) command the display device to render a textual icon adjacent to the aircraft icon, the textual icon representative of the active mode of the autopilot, and
(iv) automatically update the flight plan to designate the waypoint at the start of the at least one flight leg as a from-waypoint.

15. The system of claim 14, further comprising:
an automatic flight control system, the automatic flight control system including the variable position user input device.

16. The system of claim 15, wherein:
the automatic flight control system further includes a mode selector user interface;
the mode selector user interface is movable to any one of a plurality of positions; and
the automatic flight control system is configured to supply the autopilot mode signal based on the position of the mode selector user interface.

17. The system of claim 16, wherein:
the plurality of positions of the mode selector user interface include a heading (HDG) position and a track (TRK) position; and
the variable position user input device supplies the signal representative of its position to the processor when the mode selector user interface is in either the HDG position or the TRK position.

18. The system of claim 14, wherein the variable position user input device comprises a rotary knob.

* * * * *